April 30, 1963  H. D. WARD, JR., ET AL  3,087,392
PRINTER SLOTTER ADJUSTING MECHANISM
Filed July 7, 1961  6 Sheets-Sheet 1
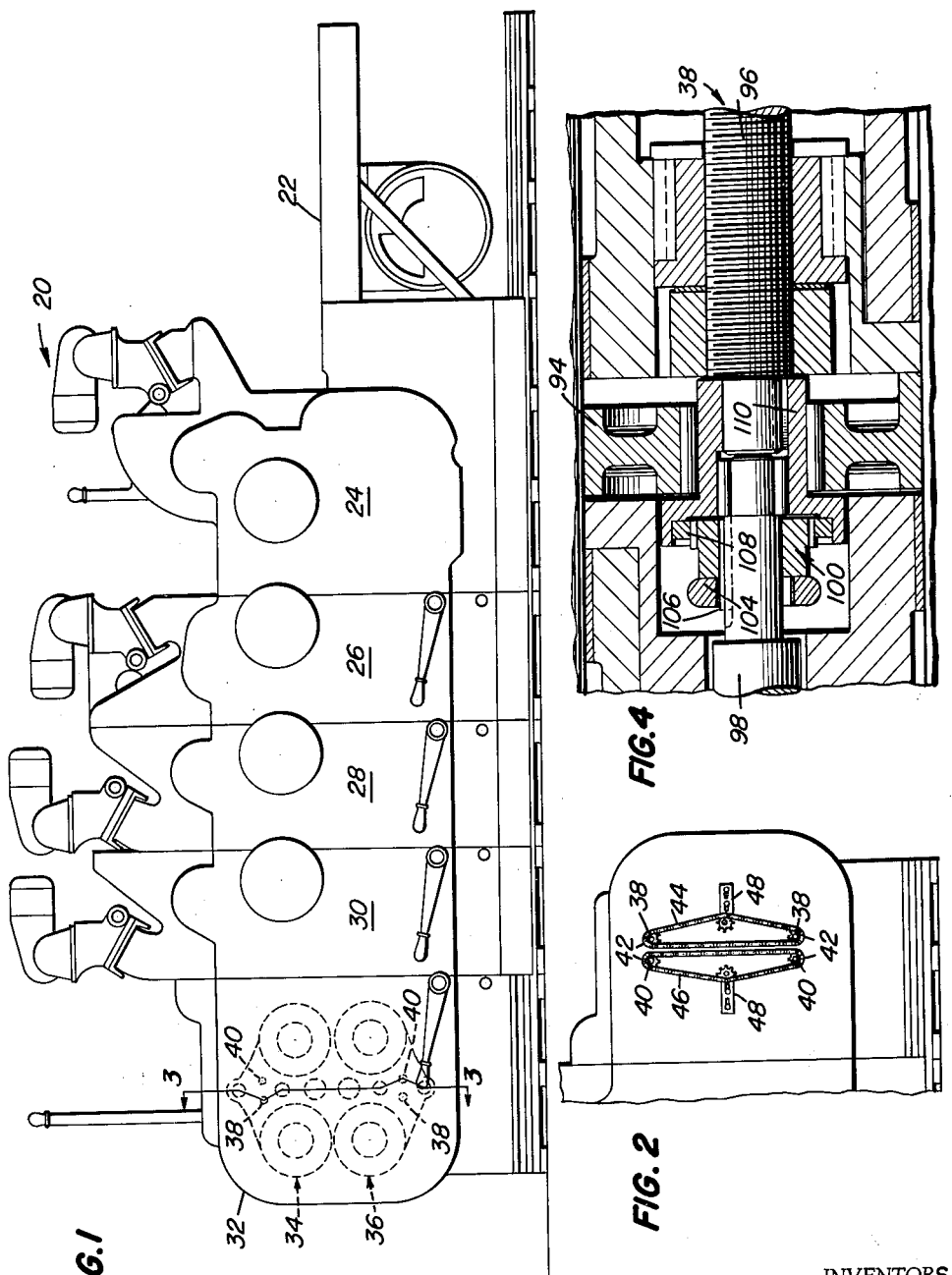
INVENTORS
Henry D. Ward, Jr.
William C. Staley
BY Walter G. Finch
ATTORNEY

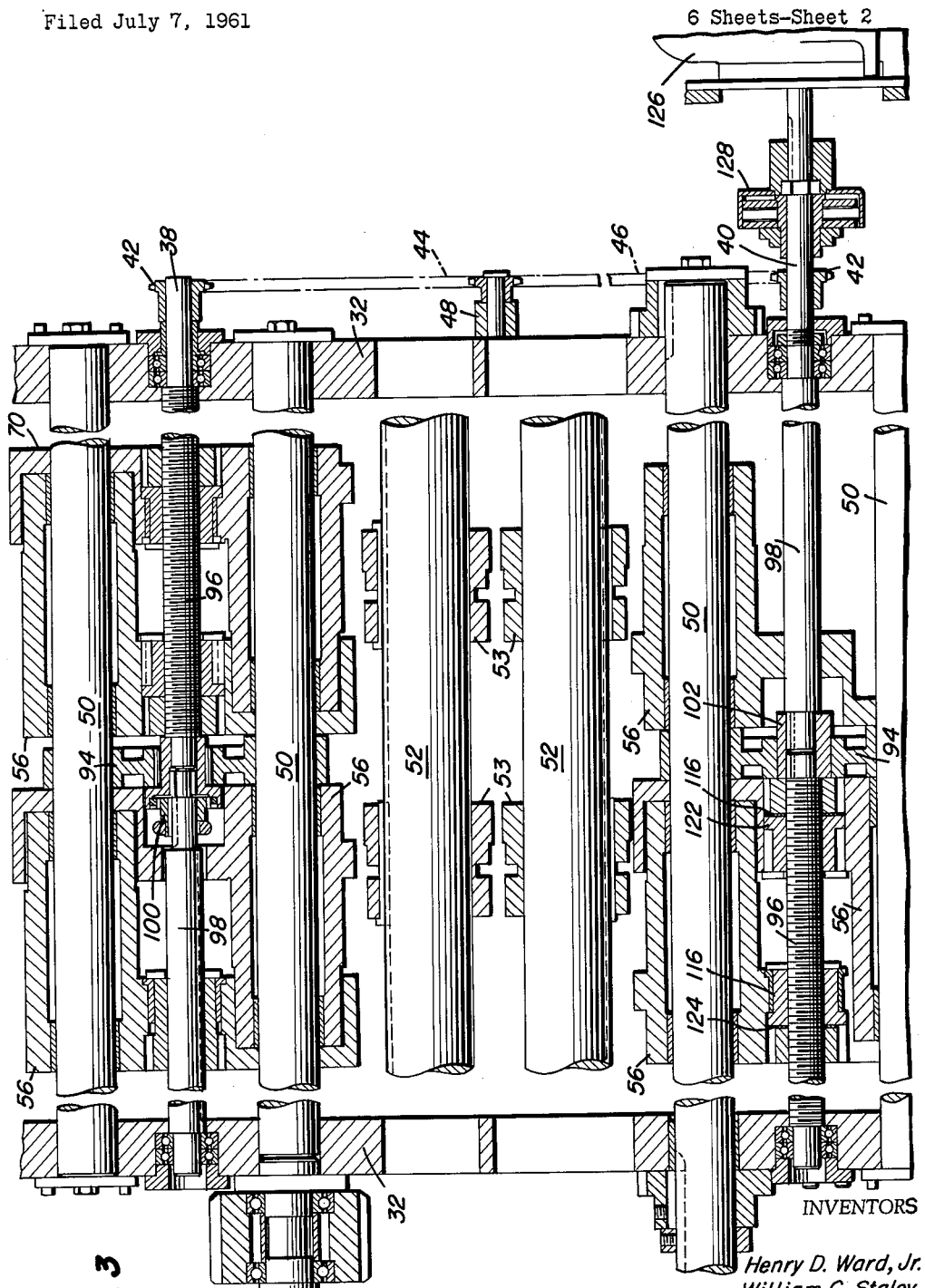

April 30, 1963   H. D. WARD, JR., ET AL   3,087,392
PRINTER SLOTTER ADJUSTING MECHANISM
Filed July 7, 1961   6 Sheets-Sheet 3
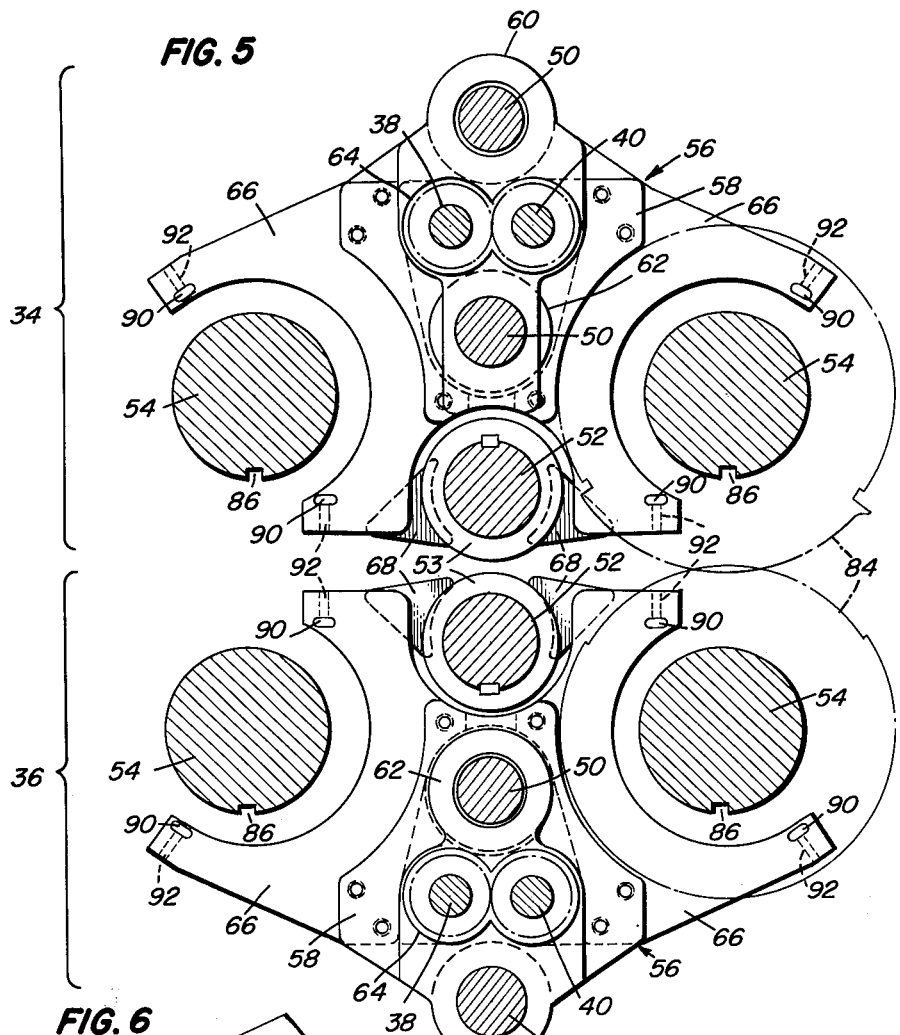
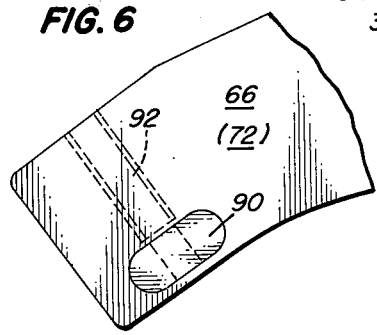
INVENTORS
Henry D. Ward, Jr.
William C. Staley
BY Walter G. Finch
ATTORNEY

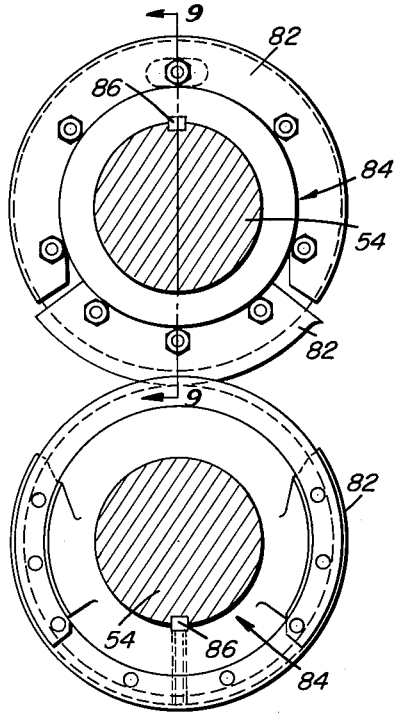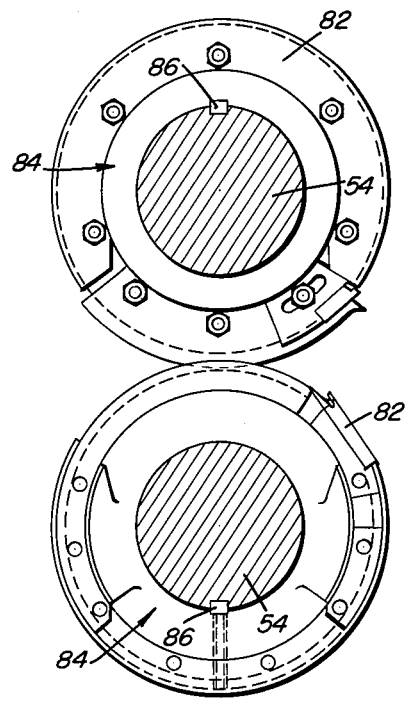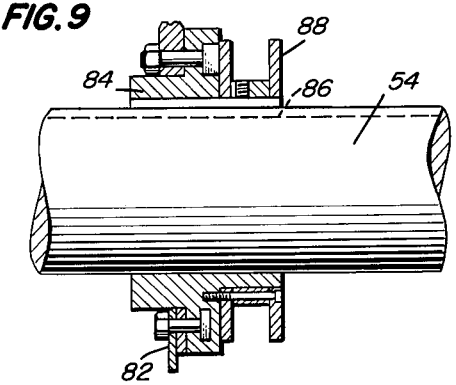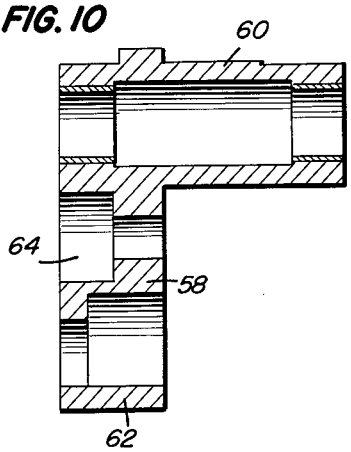
INVENTORS
Henry D. Ward, Jr.
William C. Staley
BY Walter G. Finch
ATTORNEY

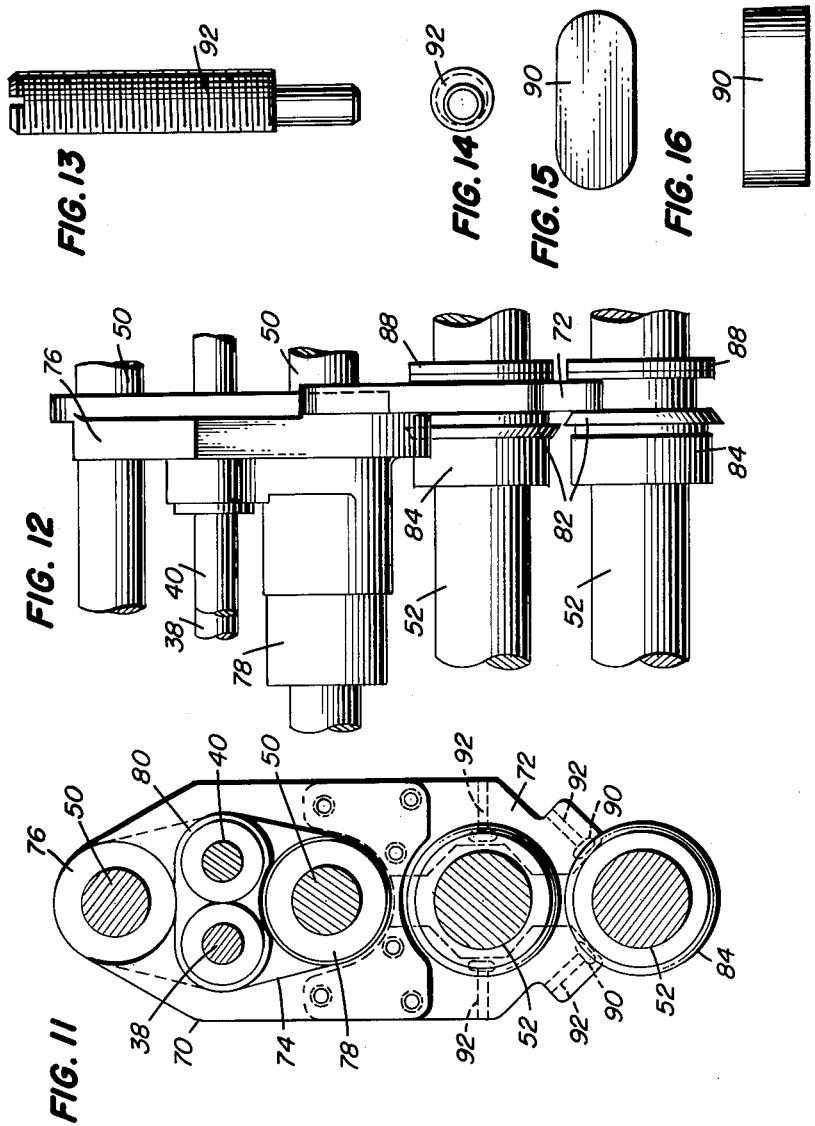

April 30, 1963 H. D. WARD, JR., ET AL 3,087,392
PRINTER SLOTTER ADJUSTING MECHANISM
Filed July 7, 1961 6 Sheets-Sheet 6

INVENTORS
Henry D. Ward, Jr.
William C. Staley

BY Walter G. Finch
ATTORNEY

United States Patent Office 3,087,392
Patented Apr. 30, 1963

3,087,392
PRINTER SLOTTER ADJUSTING MECHANISM
Henry D. Ward, Jr., Timonium, and William C. Staley, Glen Arm, Md., assignors, by mesne assignments, to Samuel M. Langston Company, Camden, N.J., a corporation of New Jersey
Filed July 7, 1961, Ser. No. 122,474
11 Claims. (Cl. 93—58.2)

This invention relates generally to box making, and more particularly it pertains to an improved slotter-creaser-trimmer mechanism for manufacturing paper cartons.

Cartons are made from a prepared blank which is creased with fold lines then notched for flaps, and trimmed to provide a butting or overlapped stapled joint. In order that the accumulated dimensional errors do not result in a skewed carton and in order to arrive at a correctly dimensioned box as required, the set-up of the blades which perform the above operations must be located and spaced with great accuracy incorporating certain added dimensional constants.

These constants are necessary to compensate for fold radii and are usually the same for a given material and thickness. However, when a machine is to be changed to produce another size carton or one of different width to depth ratio, these set-in constants are lost and must be re-introduced again in the new settings of the tool blades.

A further difficulty with prior machines is that the shifting of a blade to arrive at a given carton panel dimension changes the dimension of the adjacent panel.

Therefore, it is an object of this invention to provide a feed screw mechanism for setting the spacing of blade heads in a carton blank machine whereby the width of alternate panels of a carton blank can be adjusted together in proportion by one feed screw and the width of the other alternate panels adjusted together in proportion by another feed screw either independently or together.

Another object of this invention is to provide a carton slotter-creaser-trimmer adjustment mechanism which can be simply and easily set for carton size by electric control means.

Still another object of this invention is to provide a contiguous panel layout machine which can be adjusted to introduce dimensional constants to alternate panels and which retains these constants when alternate panels are proportionally changed together.

These and other objects and attendant advantages of this invention will become more readily apparent and understood from the following detailed specification and accompanying drawings in which:

FIG. 1 is a vertical side elevation of a printer-slotter machine incorporating features of this invention;

FIG. 2 is a vertical elevation of the reverse side of the slotter-creaser-trimmer assembly of the machine illustrated in FIG. 1;

FIG. 3 is a shortened enlarged detail section view taken along the line 3—3 of FIG. 1;

FIG. 4 is a cross-section of a juncture in the feed screw showing a quick disconnect coupling in detail;

FIG. 5 is a cross-section of an upper and lower yoke assembly of cross feeds;

FIG. 6 is an enlarged detail of a finger showing an adjustable wear button;

FIG. 7 is a side view of a front pair of cooperating heads;

FIG. 8 is a side view of a rear pair of cooperating heads;

FIG. 9 is a transverse section through a typical head as viewed along line 9—9 of FIG. 7;

FIG. 10 is a transverse section through a yoke body of a yoke assembly;

FIG. 11 is an end view of a trim yoke assembly;

FIG. 12 is a side view of the trim yoke assembly illustrated in FIG. 11;

FIG. 13 is a side view of an adjustment screw for a wear button;

FIG. 14 is an end view of the adjustment screw of FIG. 13;

FIG. 15 is a side view of a wear button;

FIG. 16 is a top view of the wear button of FIG. 15; and

Figure 17:
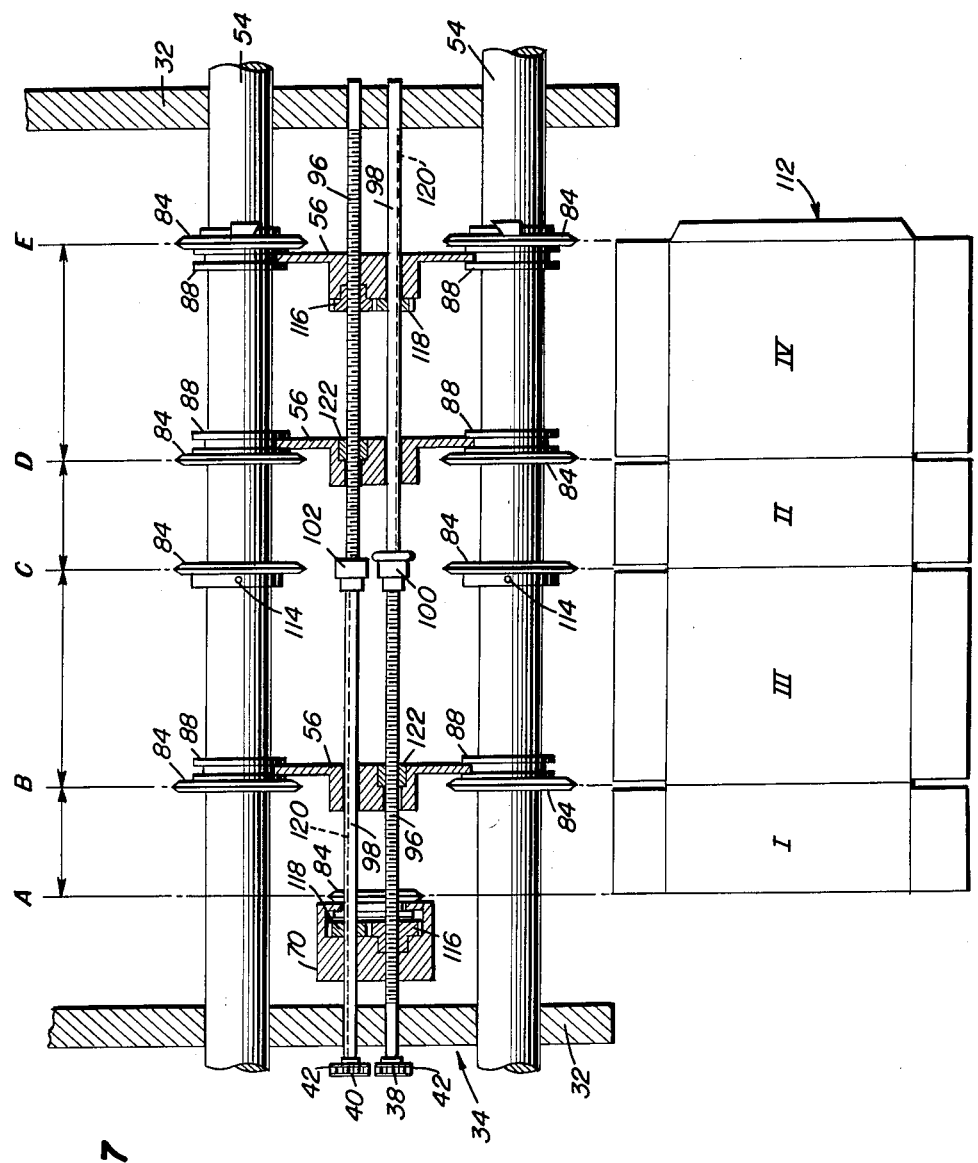
FIG. 17 is a top view of the upper cross feed assembly diagrammatically illustrating its relation to the finished carton blank.

Referring now to FIG. 1 of the drawings, there is shown depicted therein a printer-slotter machine 20 for the manufacture of corrugated containers. This printer slotter machine 20 consists basically of a paper stock supply hopper 22 from which the stock is fed in succession through a plurality of printing stations 24, 26, 28, and 30. Thence, the printed stock passes to a slotting-creasing and trimming assembly 32 with which this invention is primarily concerned.

Within the slotting-creasing and trimming assembly 32, there is provided an upper head cross feed assembly 34 and a lower head cross feed assembly 36 between which the printed paper stock is caused to travel. Each cross feed assembly 34 and 36 has two elongated feed screws 38 and 40 which extend across the slotting-creasing and trimming assembly 32 and project from one side thereof as shown in FIG. 2.

Each projecting end of the feed screws 38 and 40 is provided with a sprocket 42. The upper and lower feed screws 38 are arranged to be adjusted simultaneously to the same degree by means of a chain 44 extending from one to the other over their pair of sprockets 42. Similarly, the other pair of upper and lower feed screws 40 are coupled together by another chain 46. Each chain 44 or 46 is tensioned by means of an adjustable sprocket 48.

As shown best in FIG. 5, the upper and lower cross feed assembly 34 and 36 each further consist of a pair of vertically spaced guide bars 50, a pull roll shaft 52 and a pair of horizontal spaced head drive shafts 54. The head drive shafts 52 and 54 of both upper and lower cross feed assemblies 34 and 36 are arranged to be driven at the same speed and direction of rotation so as to be in synchronism with the feed hopper 22 and the printing stations 24, 26, 28 and 30.

The guide bars 50 do not rotate but serve in pairs as a sliding support for upper and lower yoke assemblies 56 mounted thereon. The lower pair of guide bars 50 mount these yoke assemblies 56 in an inverted position.

Each yoke assembly 56, as shown best in FIG. 10 in detail, consists of a yoke body 58 having an extended support sleeve 60 and a short support sleeve 62 which slide upon the guide bars 50. A figure-eight shaped cavity 64 is located intermediate the two sleeves 60 and 62.

Two bifurcated guide fingers 66, as shown in FIGS. 5 and 6, are fastened to each yoke body 58 and extend at opposite sides thereof so as to engage circular heads 84 to be described mounted on all four head drive shafts 54.

A wear plate 68 is secured on each guide finger 66 and they extend inwardly in a common plane so as to engage a collared pull roll 53 which is slidably keyed upon the pull roll shaft 52.

A trim yoke assembly 70 having spaced support sleeves 76 and 78 is provided to slide upon only the upper pair of guide bars 50 as shown in FIGS. 11 and 12. Only a single bifurcated finger 72 is fastened to the yoke body 74, and it extends downwardly to embrace a pair of heads 84 slidably keyed upon upper and lower pull roll shafts 52. An elongated cavity 80 through which feed screws 38 and 40 freely pass is located intermediate the trim sleeves 76 and 78.

The blades 82 which roll a crease, cut a slot or trim an edge of the carton blank are mounted, as required, on these circular heads 84 as shown in FIG. 12 and an enlarged detail in FIGS. 7, 8 and 9. Each head 84 slides freely upon its head drive shaft 54 or 52 as the case may be but is caused to rotate with it by means of a key and keyway 86 common to both.

A collar 88 is secured to one side of each head 84 as shown best in FIG. 9, and it is this collar 88 which receives the fingers 66 and the wear plates 68 or finger 72 previously mentioned in connection with FIGS. 5, 11 and 12.

Wear buttons 90 of hardened steel shown enlarged in FIGS. 15 and 16 are mounted in the tips of the fingers 66 and 72 and can be urged outwardly from their sides by means of eccentric adjustment screws 92 depicted in FIGS. 13 and 14 and as assembled in FIG. 6.

As shown in FIG. 3, both feed screws 38 and 40 are made in two halves, a threaded half 96 and a plain half 98. The mid points or junctures thereof are supported by a subframe 94 which is attached to the main frame of the slotting-creasing and trimming assembly 32.

This subframe 94 is apertured to receive a sleeve-like, splined coupling 102 for the junction in both feed screws 40 and for a quick-disconnect coupling 100 for the junction in both feed screws 38.

The quick disconnect coupling 100 for feed screws 38 is shown enlarged in FIG. 4. When a toothed knob 104 is retracted on a key 106 secured in the end of the plain half 98, it disengages from teeth 108 in a sleeve 110 keyed to the end of the threaded half 96. This allows the plain half 98 of the feed screws 38 to be rotatably adjusted with respect to the position of the threaded half 96 for setting into the machine certain tolerances required for carton forming.

To make a finished blank 112 for a typical carton as shown in FIG. 17, the three yoke assemblies 56 and the associated heads 84 are employed on the upper feed screws 38 and 40 and the upper head drive shafts 54. Similarly, in register with these but not shown, are three other yoke assemblies 56 and heads 84 are required on the lower feed screws and drive shafts 38, 40 and 54.

Another set of heads 84 which do not require the previously mentioned collars 88 and yokes 56 are firmly clamped in fixed lateral position by set screws 114 directly to all four head drive shafts 54 and in register with each other. A single trim yoke assembly 70 slides on the previously mentioned pair of upper guide bars 50 only, and is positioned by the upper feed screws 38 and 40.

Thus, from left to right as viewed in FIG. 17, the head 84 of trim yoke assembly 70 represents the locus A of a line of operation such as trimming the edge of a blank 112. The next three sets of heads 84 in lateral order represent the loci B, C, and D of the lines of operation such as slotting and creasing. The right hand heads 84 typically perform a flap-cutting operation on the blank 112 upon a locus E.

It will be noted that locus C is fixed since the corresponding heads 84 thereof are secured by set screws 114, whereas loci A, B, D and E depend on the translation of yokes 56 or 70 by the feed screws 38 and 40.

It should be understood that the corresponding heads 84 of this upper cross feed assembly 34 and those of the previously mentioned lower cross feed assembly 36 remain in register during the translations so that their blades 82 can cooperate as previously illustrated in FIGS. 7 and 8.

The trim yoke assembly 70 as well as the outermost upper and lower yoke 56 retain a geared nut 116 and in mesh therewith a keyed gear 118 in their previously mentioned cavities 80 and 64 respectively.

The geared nut 116 is threaded upon its respective threaded half 96 while the keyed gear 118 is slidable upon the adjacent plain half 98 which has a longitudinal keyway 120. The remaining intermediate yokes 56, both upper and lower, each have only a fixed nut 122 which threads upon their respective threaded halves 96.

The geared nut 116 as well as the fixed nut 122 are in practice both made in two pieces so they can be taken up in jam-nut fashion with an intervening shim 124 to compensate for thread wear as shown in FIG. 3. Also the mated gears and gear nuts 118 and 116 are of the same pitch diameter so as to have a ratio of one-to-one.

A reversible positioning motor 126 having a safety clutch 128 may be attached to one feed screw 40 where push button or automatic control of carton size is required. A similar motor and clutch (not shown) is then used for setting the feed screws 38.

With reference to FIG. 17, when the feed screw 40 is rotated, its threaded half 96 moves the two spaced right hand yokes of the yoke assembly 56 as a constantly spaced pair away from the fixed position heads 84. At this time, the geared nut 116 in the outermost right hand yoke 56 acts as a fixed nut because it is restrained from turning by the associated gear 118 which is keyed to the plain half 98 of the presently stationary feed screw 38.

At the same time, that feed screw 40 is turned its plain half 98 to which gear 118 is keyed, thereby rotates associated geared nut 116 in the trim yoke assembly 70 and the latter moves along the threaded half 96 of stationary feed screw 38. The trim yoke assembly 70 is caused to move an equal amount oppositely to the movement of the previously mentioned right hand pair of yokes 56 of the yoke assemblies because the thread halves 96 of the feed screws 38 and 40 are made opposite hand but with the same pitch.

Stated more simply, turning feed screws 40 results in loci D and E moving as a unit in one direction with respect to locus C. Locus A moves in an oposite direction in equal amount with respect to locus C and locus B remains stationary.

Turning feed screw 38 results in loci A and B moving as a unit in one direction with respect to locus C. Locus E moves in an opposite direction in equal amount with respect to locus C and locus D remains stationary.

It will be noted that the effect of adjusting feed screw 40 is to modify simultaneously the end panels I and II of the finished carton blank 112 an equal amount.

Feed screw 38 modifies simultaneously the side panels III and IV an equal amount. Thus the width or depth of a finished carton can readily be governed.

If both feed screws 38 and 40 are turned an equal amount in panel increasing direction, a blank for a larger carton having an unchanged ratio of width to depth results. Any previously set-in dimensional constant to either width or depth is retained for any setting and can only be changed by decoupling the junctions in the feed screws 38.

Obviously many modifications and variations of the present invention are possible in the light of the above teachings. It is, therefore, to be understood that within the scope of the appended claims the invention may be practiced otherwise than as specifically described.

What is claimed is:

1. An assembly of yokes arranged for lateral translation with respect to an intermediate fixed locus, comprising, a right pair of yokes, a left pair of yokes, means including a pair of feed screw members extending through said yokes, each said feed screw members having a threaded portion and a keyed portion, the threaded portion of one feed screw member being positioned opposite hand to the threaded portion of the other feed screw member, each said threaded portion extending to a point substantially in the plane of said fixed locus, each yoke of said right and left pairs of yokes thereof that is adjacent to said fixed locus being mounted threadally on the threaded portion of its respective feed screw member, each other yoke of said right and left pairs thereof having a gear means journaled therein and keyed to the keyed portion of the feed screw member passing therethrough and a geared nut means threadally mounted on the threaded portion of the feed screw member passing through said yokes, said gear and geared nut means being intermeshed and means to rotate at least one of said feed screw members, whereby when one of said feed screw members rotates, the geared nut means at the threaded portion thereof is held stationary by said gear which is keyed to the other feed screw member and the gear which is keyed to the keyed portion of said feed screw member that is rotating operates its respective geared nut means and as a result thereof, said other, outermost yokes move with respect to said fixed locus.

2. The assembly of yokes of claim 1, and additionally tool means located at said fixed locus, and tool means in operative engagement with the yokes of said right and left pairs.

3. The assembly of yokes of claim 1 wherein said fixed locus is comprised of upper and lower fixed tool means and said assembly of yokes is associated with said upper fixed tool means and another yoke assembly of substantially the same structure is associated with said lower fixed tool means, both said yoke assemblies being in operative engagement.

4. The assembly of yokes of claim 3, and additionally means operatively connected to the yoke assemblies associated with said upper and lower tool means to enable the lateral movement of correspondingly yokes of said yoke assemblies to be simultaneously adjusted.

5. The assembly of yokes of claim 1, and additionally means for setting in a dimensional constant to either of said feed screw members for compensating for bending in a carton blank.

6. The assembly of yokes of claim 5, wherein the threaded portion of the feed screw member having said means for setting in a dimensional constant is separable from the keyed portion of said feed screw member and one of said portions is provided with a slidable member which is retractable thereon to permit relative rotation between said one portion and the other portion of said feed screw member and is extendable to interlock with said other portion of the feed screw member to prevent relative rotation between said one portion and said other portion of said feed screw member.

7. An assembly of yokes arranged for lateral translation with respect to an intermediate fixed locus, comprising, a right pair of yokes, a left pair of yokes, means including a pair of feed screw members extending through said yokes, each said feed screw members having a threaded portion and a keyed portion, the threaded portion of one feed screw member being positioned opposite hand to the threaded portion of the other feed screw member, each yoke of said right and left pairs of yokes thereof that is adjacent to said fixed locus being mounted threadably on the threaded portion of its respective feed screw member, each other yoke of said right and left pairs thereof having a gear means journaled therein and keyed to the keyed portion of the feed screw member passing therethrough and a geared nut means threadably mounted on the threaded portion of the feed screw member passing through said yokes, said gear and geared nut means being intermeshed, and means to rotate at least one of said feed screw members, whereby when one of said feed screw members rotates, the geared nut means at the threaded portion thereof is held stationary by said gear which is keyed to the other feed screw member and the gear which is keyed to the keyed portion of said feed screw member that is rotating operates its respective geared nut means and as a result thereof, said other, outermost yokes move with respect to said fixed locus.

8. An assembly of yokes arranged for lateral translation with respect to an intermediate fixed locus, comprising, a right pair of yokes, a left pair of yokes, means including a pair of feed screw members extending through said yokes, each said feed screw members having a threaded portion and a keyed portion, the threaded portion of one feed screw member being positioned opposite hand to the threaded portion of the other feed screw member, each yoke of said right and left pairs of yokes thereof that is adjacent to said fixed locus being mounted threadally on the threaded portion of its respective feed screw member, each other yoke of said right and left pairs thereof having a gear means journaled therein and keyed to the keyed portion of the feed screw member passing therethrough and a geared nut means threadably mounted on the threaded portion of the feed screw member passing through said yokes, said gear and geared nut means being intermeshed, and means to rotate each said feed screw members, whereby when one of said feed screw members rotates, the geared nut means at the threaded portion thereof is held stationary by said gear which is keyed to the other feed screw member and the gear which is keyed to the keyed portion of said feed screw member that is rotating operates its respective geared nut means and as a result thereof, said other, outermost yokes move in unison as well as one of said threadably mounted yokes with respect to said fixed locus and when the other of said feed screw members rotates, said outermost yokes and the other of said threadally mounted yokes move in unison with respect to said fixed locus.

9. The assembly of yokes of claim 8, wherein the threaded portions of said pair of feed screw members are threaded opposite hand with respect to each other so that the outermost yoke of said right pair of yokes and of said left pair of yokes move in opposite directions with respect to said fixed locus upon rotation of either feed screw member of said pair thereof.

10. A mechanism for establishing translation of a plurality of tools relative to each other, comprising, a right pair of yokes, a left pair of yokes, tool means in engagement with each yoke of said pairs thereof to be movable therewith, a fixed tool means mounted intermediate the tool means in engagement the right pair of yokes and the tool means in engagement with the left pair of yokes, means including a pair of feed screw members extending through said yokes, each said feed screw members having a threaded portion and a keyed portion, the threaded portion of one feed screw member being positioned opposite hand to the threaded portion of the other feed screw member, each yoke of said right and left pairs of yokes thereof that is adjacent to said fixed tool means being mounted threadably on the threaded portion of its respective feed screw member, each other yoke of said right and left pairs thereof having a gear means journaled therein and keyed to the keyed portion of the feed screw member passing therethrough and a geared nut means threadably mounted on the threaded portion of the feed screw member passing through said yokes, said gear and geared nut means being intermeshed, and means to rotate at least one of said feed screw members, whereby when one of said feed screw members rotates, the geared nut means at the threaded portion thereof is held stationary by said gear which is keyed to the other feed screw member and the gear which is keyed to the keyed portion of said feed screw member that is rotating operates its respective geared nut means and as a result thereof, said other, outermost yokes move in unison and the tool means in engagement therewith with respect to said fixed tool means.

11. An assembly of yokes arranged for lateral translation with respect to an intermediate fixed locus, comprising, a plurality of yokes positioned on each side thereof, means including a pair of feed screw members extending through said yokes, each said feed screw members having a threaded portion and a keyed portion, the threaded portion of one feed screw member being positioned opposite hand to the threaded portion of the other feed screw member, the innermost yokes of said plurality of yokes positioned on each side of said fixed locus being mounted threadably on the threaded portion of its respective feed screw member, the outermost yokes of said plurality of yokes positioned on each side of said fixed locus having a gear means journaled therein and keyed to the keyed portion of the feed screw member passing therethrough and a geared nut means threadably mounted on the threaded portion of the feed screw member passing through said yokes, said gear and geared nut means being intermeshed, and means to rotate at least one of said feed screw members, whereby when one of said feed screw members rotates, the geared nut means at the threaded portion thereof is held stationary by said gear which is keyed to the other feed screw member and the gear which is keyed to the keyed portion of said feed screw member that is rotating operates its respective geared nut means and as a result thereof, the outermost yokes as well as one of said innermost yokes move in unison with respect to said fixed locus.

References Cited in the file of this patent
UNITED STATES PATENTS
2,982,189    Shields _____ May 2, 1961